Figure 12:
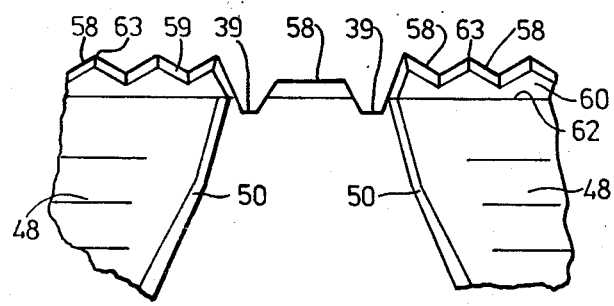

United States Patent [19]

Padovani

[11] 4,161,382
[45] Jul. 17, 1979

[54] APPARATUS FOR PRODUCING A CONTAINER MATRIX

[75] Inventor: Pietro Padovani, Verona, Italy

[73] Assignee: Industrie Specializzate Articoli Plastici S.p.A., Verona, Italy

[21] Appl. No.: 831,822

[22] Filed: Sep. 9, 1977

[30] Foreign Application Priority Data

Sep. 15, 1976 [IT] Italy ................ 84955 A/76

[51] Int. Cl.² .......................................... B29C 17/14
[52] U.S. Cl. .................................... 425/291; 425/304; 425/388; 264/163
[58] Field of Search ............. 425/289, 388, 292, 291, 425/290, 295, 302.1, 304, 317, 806 R; 264/89, 163

[56] References Cited

U.S. PATENT DOCUMENTS

| | | | |
|---|---|---|---|
| 2,230,074 | 1/1941 | Caperton | 425/304 X |
| 2,547,331 | 4/1951 | Lent | 425/302.1 |
| 2,953,814 | 9/1960 | Mumford | 425/806 R X |
| 3,240,851 | 3/1966 | Scalora | 425/302.1 X |
| 3,518,334 | 6/1970 | Carrigan et al. | 425/384 X |
| 3,862,817 | 1/1975 | Dahlberg | 425/302.1 X |
| 3,869,975 | 3/1975 | Seewer | 425/304 X |

Primary Examiner—Robert L. Spicer, Jr.
Attorney, Agent, or Firm—Morris Liss; Israel Gopstein

[57] ABSTRACT

In a moulding apparatus for producing a plastics material container matrix, a lower mould member defining a bore from its lower surface to its upper surface, die means slidably displaceable within said bore for deforming said plastics material, cutter means slidably displaceable within said bore defining at least one cutting edge extending obliquely to the longitudinal axis of the cutter means, and an upper mould member having a pressure member displaceably mounted thereon, the lower surface of the pressure member defining a cavity aligned with said bore in said lower mould member, which cavity receives at least a portion of said cutter member and die means when they are displaced.

4 Claims, 36 Drawing Figures

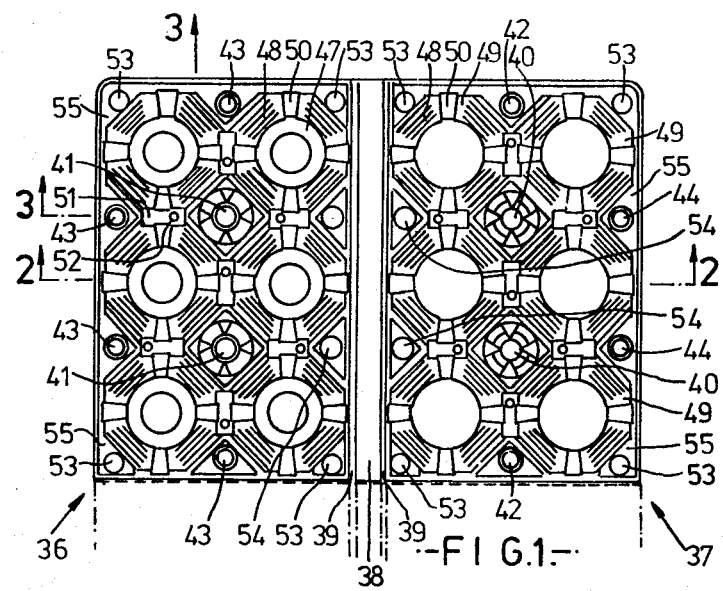
-FIG.1.-
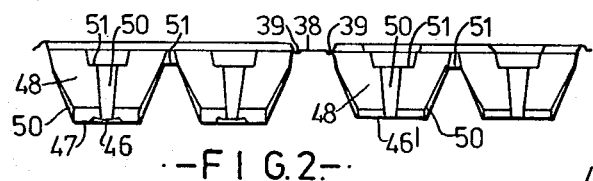
-FIG.2.-
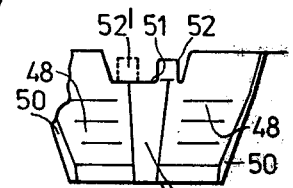
-FIG.3.-
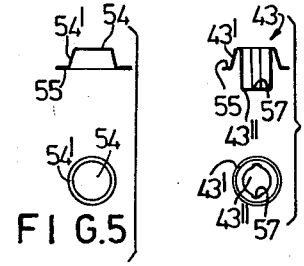
-FIG.4.- FIG.5 -FIG.6.-
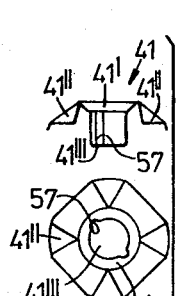
-FIG.7.-
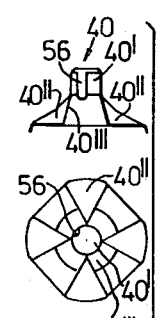
-FIG.8.-
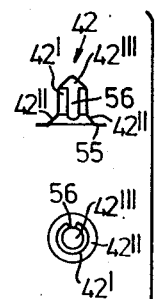
-FIG.9.-
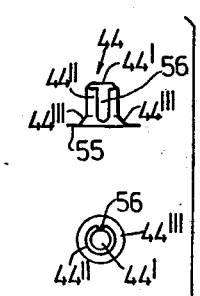
-FIG.10.-

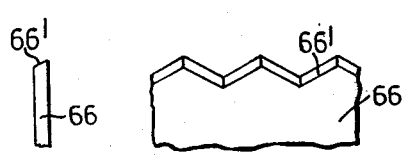
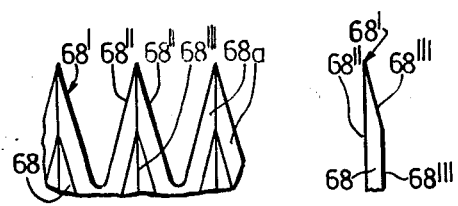
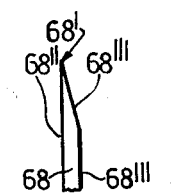
FIG.23.   FIG.22.   FIG.24.   FIG.25.
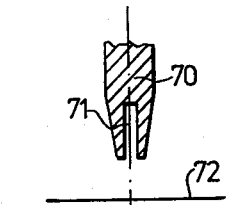
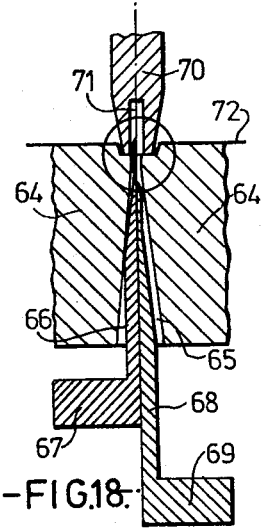
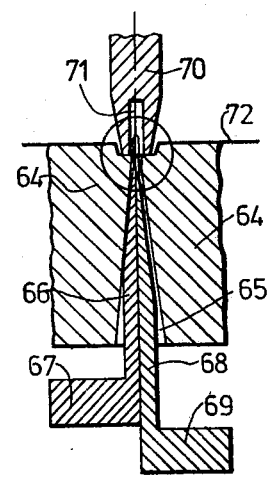
FIG.17.   FIG.18.   FIG.19.
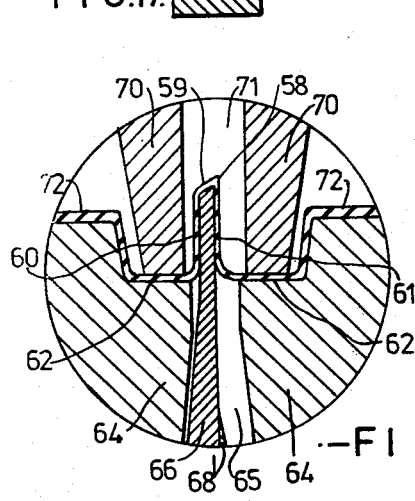
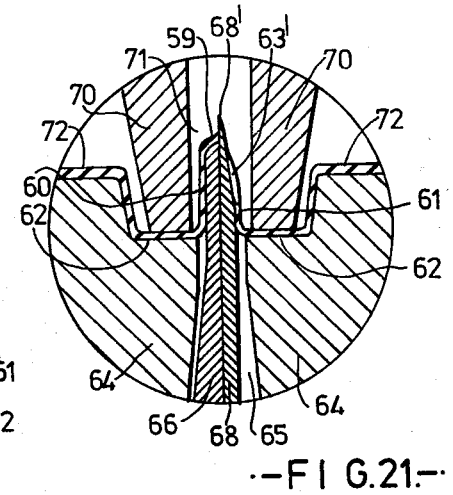
FIG.20.   FIG.21.

APPARATUS FOR PRODUCING A CONTAINER MATRIX

The present invention relates to an apparatus for producing a container matrix. Such a matrix comprises at least two separable containers having a pre-formed rupture line between them. Each container may be a single- or multi-celled.

The containers are made from thermoplastic sheet material, such as polystyrene, expanded polystyrene or polyvinyl plastics materials by moulding utilising a vacuum or air pressure. The or each cell of the containers may carry eggs, fruit or other foodstuffs. Each container usually comprises a base portion and a cover portion of similar shapes, which portions are interconnected by a folding rib or spine, and interengaging closure members actuated by manual pressure. In their simplest form, however, the containers may be open, rectangular or square receptacles intended to receive foodstuffs.

When forming such containers, it is known to pre-form rupture lines between adjacent containers by utilising a series of needles, the points of which are so located as to penetrate into the foil but not to completely pierce it. This piercing is effected whilst the container is being formed and whilst displaceable mould members effect the shaping of the sheet material on either side of the pre-determined location of the rupture line. In such a process, the rupture line cannot be provided with perforations extending completely through the sheet since it is subjected to tensioning during its formation, which causes premature splitting of the sheet along the rupture line, or along a part thereof. This, in turn, produces an irregular configuration of the rupture line in the finished container matrix.

By means of the above-described process, it is thus possible to produce pre-determined rupture lines in a container matrix during the moulding of the matrix. The containers thus formed are separated from one another simply by tearing along the rupture line. However, when the containers are separated from one another, jagged edges are formed on those edges of each container along which separation from an adjacent container has taken place. This makes the separated container difficult to handle. If the container is open and is intended to be covered by a thin sheet of, for example, tin foil, it is difficult to ensure that the tin foil adequately seals the container in the region of the jagged edge or edges.

It is also known to make matrices of containers from paper, cardboard or pasteboard, and to pre-form rupture lines by forming cuts and/or through bores therein by means of hollow punches. The cutting edges of the punches lie in planes parallel to those of the sheet in which the rupture line is to be formed. This process, which is widely used, cannot be successfully utilised for containers made of plastics material, because of the physical characteristics of the plastics material. Practical tests on plastics material have, moreover, shown that the cutting edges of the punches rapidly become worn due to the parallelism of the cutting surfaces with the plastics material sheet and due to the resistance of the plastics material itself to the action of the punches. Many plastics containers thus formed are liable to rupture because they are necessarily tenuous. When rupture lines are formed in this manner, it frequently occurs that rupture occurs transversely of the rupture line when an attempt is made to separate two containers with resultant damage to the main body of the container.

The present invention seeks to provide an apparatus for forming a container matrix which makes it possible to pre-form rupture lines between adjacent containers by means of cuts, which cuts are effected in such a manner that, during the separation of two containers from one another, rupture does not take place transversely of the rupture line.

According to the present invention, there is provided in a moulding apparatus comprising an upper mould member and a lower mould member for forming a plastics material container matrix having a pre-determined line of rupture between adjacent containers, the improvement comprising providing said lower mould member with an upper surface for receiving said plastics material and a lower surface, said mould member defining a bore extending from said upper surface to said lower surface, die means slidably displaceable within said bore for deforming said plastics material, cutter means slidably displaceable within said bore for cutting said plastics material, said cutter means defining a plurality of faces, a longitudinal axis and at least one cutting edge, said at least one cutting edge extending obliquely to said longitudinal axis, and providing said upper mould member with a pressure member displaceably mounted thereon, said pressure member having a lower surface, said lower surface defining a cavity aligned with said bore in said lower mould member, said cavity receiving at least a portion of said cutter member and said die member when said members are displaced.

It is particularly important that the cutting edges of the cutting device extend at an angle relative to the longitudinal axis thereof since, by so doing, the penetration of the cutting edges into the plastics material is facilitated. Moreover, such an arrangement makes it possible to score, i.e. not cut completely through the material in the regions connecting adjacent cuts.

It is obvious that the ridge, in accordance with the type of former member employed to produce it, can extend in a straight line, or alternatively in a wavy line, broken or mixed, in dependence upon the characteristics of the container and the chemical and physical characteristics of the material employed.

In accordance with a further aspect of the present invention, a predetermined breakage line is formed, constituted by cuts extending completely through the plastics material and by connecting portions between the cuts which are scored along the ridge of the roof-shaped structure, whereby during separation of two containers from one another, the separating line extends along the scored or partially incised portions where the molecular strength of the material has been weakened compared with that of the inclined flap or flaps.

Figure 11:
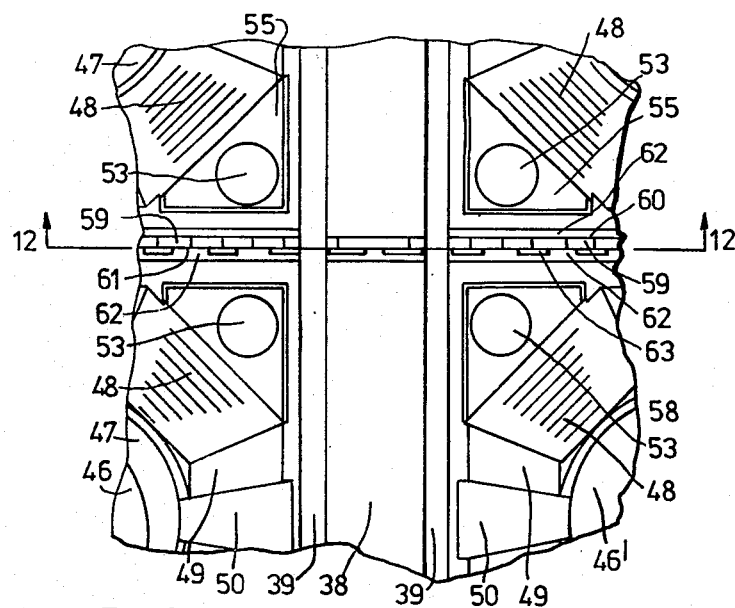
Figure 11A:
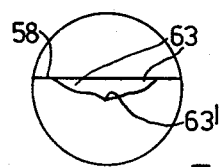

The present invention will be further described, by way of example, with reference to the accompanying drawings, in which:

FIG. 1 shows a top view of a discrete container suitable for carrying six eggs,

FIG. 2 shows, schematically, a sectional view taken along the line 2—2 of FIG. 1, FIG. 3 shows, schematically, a sectional view showing a connecting saddle between two adjacent cells of the container shown in FIG. 1, the section being taken along the line 3—3 of FIG. 1, FIGS. 4 to 10 show vertical sections and bottom plan views of pressure operated closure members and spacers forming parts of the container shown in FIG. 1, FIG. 11 is a plan view of part of two adjacent containers in a matrix, and shows a pre-formed weakened region defining a rupture line for separating the two containers from one another, FIG. 11A shows a greater detail of a cut shown in FIG. 11.

Figure 32:
Figure 29:
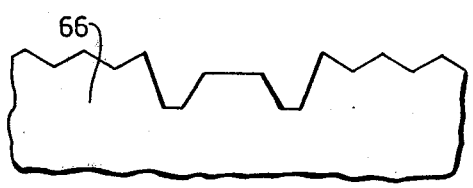
Figure 26:
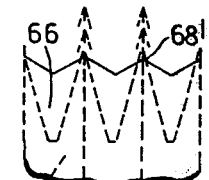
Figure 33:
Figure 30:
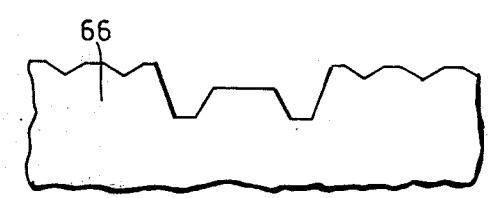
Figure 27:
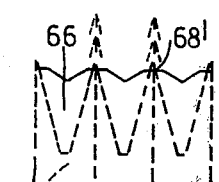
Figure 34:
Figure 31:
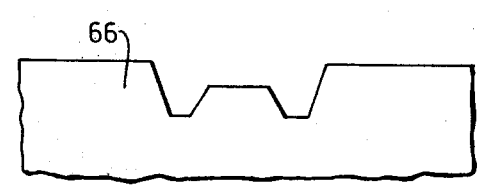
Figure 28:
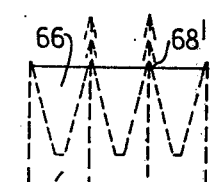

FIG. 12 shows a vertical section taken along the line 12—12 of FIG. 11,

FIGS. 13 and 14 and FIGS. 15 and 16 each show a partial front view and side view respectively of the two containers shown in FIGS. 11 and 12 after they have been separated from one another, FIGS. 17, 18 and 19 each show a vertical section through the principle members of a device utilised for producing the rupture line, in different working positions thereof, FIGS. 20 and 21 show details, on an enlarged scale of the portions ringed in FIGS. 18 and 19 respectively, FIGS. 22 and 23, and FIGS. 24 and 25 show, respectively front and partial side view of the die blade and the points of the cutting blade, the die blade and the cutting blade both forming part of the device shown in FIGS. 17 to 21, FIGS. 26, 27 and 28 show, respectively partial front views of three die blades having different types, ridges and, superimposed in broken lines thereon, the points of the blade of the cutting device, FIGS. 29, 30 and 31 show a front view of the die blades shown in FIGS. 26 to 28 respectively and illustrate the particular extension of the ridge corresponding with the folding rib of the egg container, FIGS. 32, 33 and 34 show three partial side views of the die blade as shown in FIGS. 26 to 31, FIG. 35 is a detailed view of the portion ringed in FIGS. 32, 33 and 34, on an enlarged scale, in one particular embodiment.

In the various Figures, the same reference numerals have been utilised to identify like or equivalent parts.

FIGS. 1 and 2, there is shown a container which comprises a base portion 36 having six cells for receiving, for example, eggs and a cover portion 37 having the same number of cells. The base portion 36 is connected to the cover portion 37 by a rib 38. Two grooves 39 are formed in the rib 38 which permit the cover portion 37 to be folded over so as to be disposed on the base portion 36. The base portion 36 and the cover portion 37 may be snap-fitted together by closure members of the push-button type, identified by the reference numerals 40-41, 42-43 and 44-43. These closures will be described in greater detail hereinafter.

The individual cells for receiving the eggs each have a base portion 46 comprising a substantially spherical cap portion which is surrounded by a circular crown portion 47, the crown portion being above of the cap portion and forming a support for the container. Each cell also has side walls which flare outwardly from the base portion. The side walls have grooves 48 formed thereon, between which extend smooth wall portions 49 having channels 50 to act as reinforcements. These channels 50 converge towards the base of the container. The smooth wall portions 49 of two adjacent cells are inter-connected by a horizontal surface or saddle 51 from which a truncated cylinder 52 projects. This cylinder acts as a spacer member and, when empty containers are stacked one upon the other, prevents the nesting of an upper container in the container located immediately therebelow.

As can best be seen in FIG. 3, the cylinder 52 is on the right-hand side of the saddle 51, whilst, on the left-hand side of the surface 51, there is shown, in dotted lines, a spacer 52' projects into the containers of the following moulded position, so that the containers of one moulding operation have spacer members which are displaced relative to those of the following moulding operation.

When the eggs are located on the base 46 of the base portion 36, the cover portion 37 is closed over the base portion 36. When the container is closed the base 46' of the cover portion 37 is located over the eggs. The individual cells are formed in the surfaces 55 of the base portion and cover portion 36 and 37 respectively and once the container is closed, the two surfaces 55 are maintained spaced apart from one another by spacer members 53 and 54 having frusto-conical side walls 53' and 54' (as can be seen in FIGS. 4 and 5), and by closure members as shown in FIGS. 6 to 10.

In FIG. 6, there is shown a female closure element 43. This closure member is surrounded by a frusto-conical collar portion 43' which stands above the surface 55 of the base portion 36. The upper surface of the collar portion 43' has a substantially cylindrical depression formed therein. The depression has a base 43'', and provided on its side wall with two narrow channels 57, acting as vents. The female closure member 43 is adapted to receive a male closure member 42 or 44, of the type shown in FIG. 9 or 10. The male closure member 42 projects from the surface 55 of the cover member 37 and has a frusto-conical collar portion 42'' surmounted by a cylindrical portion 42', which latter terminates in a conical portion 42'''. A narrow channel 56, acting as a vent, is formed in this male closure member. The male closure member 44 shown in FIG. 10, also projects from the surface 55 and has a frusto-conical collar 44''' surmounted by a cylindrical portion 44'', which latter terminates in a frusto-conical portion 44'. A narrow channel 56 acting as a vent is formed in this member.

The male closure elements 42 and 44 and the female closure elements 43 are located around the periphery of the base portion and cover portion 36 and 37 respectively of a container, whilst the male closure elements 40 and female closure elements 41, shown in FIGS. 8 and 7 respectively are located in the central regions of the base member 36 and cover member 37. The male closure member 40 has a cylindrical body portion 40' provided with a narrow channel 56 as a vent, which cylindrical body portion is formed on a frusto-conical collar portion 40'''. The base of the portion 40' has depressions having conoidal segments 40'' formed therein for reinforcing purposes, the depressions also being formed on the collar 40'''. The female closure member 41 has a projecting collar portion in which the recess is formed. The shape of the member 41' generally corresponds to that of the male closure member 40 and it also is provided with reinforcing conoidal segments 41''. The recesses have a tapered portion 41' leading into a cylindrical portion terminating in base portion 41''', the cylindrical portion being provided with two narrow channels 57 as vents.

The male and female elements shown in FIGS. 6 to 10 are all similar in that, when a male element is inserted in the corresponding female element, at least one pair of channels 56 and 57 respectively are located opposite one another and define a passage having a substantially circular cross-section. This avoids pressure forces developing when the male element is inserted into the female element, which forces would make it difficult to close the container.

FIG. 1 shows a container formed of portions 36, 37 which has already been separated from an adjacent container. Parts of the centre rib and the sides of the adjacent container are shown in dot-dash lines, the line of separation of the two containers being shown in broken lines along the lower edge of the container which is fully shown. FIGS. 11 and 12 show this rupture line and the regions of the containers adjacent thereto in greater detail.

In these Figures, the line of rupture coincides with the section line 12—12 in FIG. 11. This line 12—12 also represents a ridge 58. Above (as shown in FIG. 11) the ridge folds 59 can be seen, whilst cuts 63 are shown schematically below the line. One of the cuts is shown in greater detail in FIG. 11A. In the figure it can be seen that the cuts 63 are formed in the ridge 58 itself which extend downwardly as shown at 63'. This can also be clearly seen in FIG. 15.

From FIG. 12, it can be seen that the ridge 58, in the saddle region thereof between the channels 39 is located at a lower level than the remainder of the ridge. The cuts are produced with a tapered cutting blade, to be described in greater detail hereinafter, having a fixed length of stroke and accordingly the cuts made by the cutting blade in this saddle region will be wider than the remaining cuts.

Figure 16:
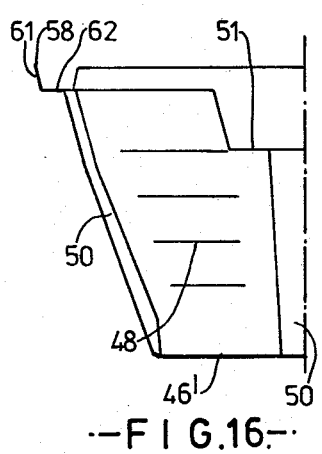
Figure 15:
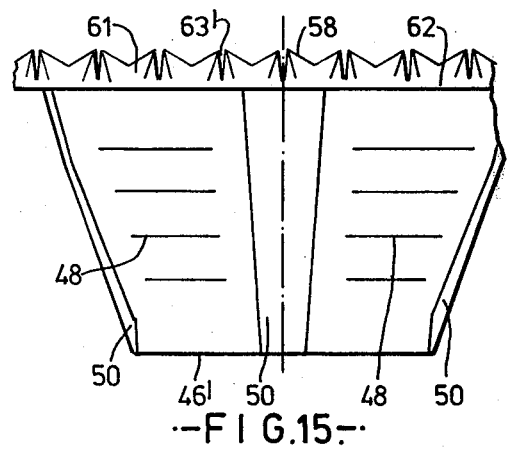

In FIGS. 15 and 16, the cuts 63' are clearly shown as being formed in a wall portion 61 connecting the ridge 58 to the body portion 62 of one of the containers.

Figure 13:
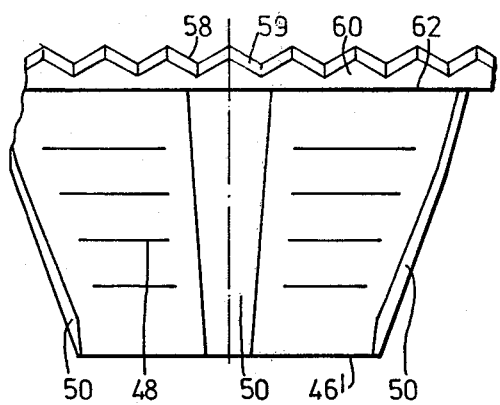
Figure 14:
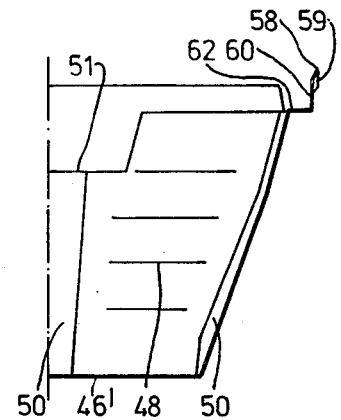

From FIGS. 13 and 14, it will be seen that the folds 59, and the wall portion 60 which connects them to the body of the other container 62 are neither cut nor split.

In FIG. 17 there is shown a device for producing a rupture line shown in FIGS. 11 to 16. FIG. 17 shows a portion of the lower mould member 64 utilised for forming containers, which member 64 has a bore 65 in which are received a forming member 66 and a cutter blade 68. The lower ends 67 and 69 of the member 66 and the blade 68 respectively, are connected to means (not shown) for displacing them relative to the part 62 (see FIGS. 20 and 21) of the mould. The bore 65 opens into a recess 73 formed in the upper surface of the lower mould member 64. Plastics material foil or sheet 72 from which the container is to be made is laid across the upper surface of the lower mould member 64 including along the base of the recess 73. The shaping of the foil in the region of the rupture line is effected by the action of the member 66 and the blade 68 in conjunction with a mould member 70. To do this the foil must, of course, be heated. The member 70 has a cavity 71 formed therein for receiving the upper ends of the forming member 66 and the cutter blade 68. The member 70 is displaceable relative to the upper mould member (not shown) utilised for forming the containers.

When the two parts of the mould are closed one upon the other, the forming member 66 is displaced upwardly so that the upper end portion 66' thereof comes into contact with the foil 72. By the end of its upward movement, the member 66, in co-operation with the member 70, has produced folds 59 in the container and has caused stretching of those parts of the foil which connect it to the main body of the container, since the remainder of the foil in this region is held against the base of the recess 73.

The foil forming upper portion of the fold 59 will cool when it contacts the inclined surfaces 66' of the member 66 and therefore thicken. Initially, the walls 60 and 61 of the fold do not contact the member 66, and therefore remain hot and stay thin due to the fact they have been stretched. Finally, they become extended due to vacuum action or air pressure which then causes them to adhere to the die 66, as can be seen in FIGS. 18 and 20.

The forming member or die 66 thus produces a roof-like structure having comparatively thick folds 59 and a comparatively thin ridge 58, that is to say, thin compared with the upper part of the wall 61 which connects the folds 59 to the body of the container by means of a compression channel 62.

As soon as the container and the roof-like structure have been formed, cutting of the foil is commenced by utilising the blade 68. The blade 68 terminates in tips 68', the blade being moved from the positions shown in FIGS. 18 and 20 to those shown in FIGS. 19 and 21.

From FIGS. 24 and 25, it will be seen that the tips 68' of the blade 68 are wedge-shaped and are provided with lateral cutting edges 68'', connected by inclined surfaces 68a to rear cutting edges 68'''.

During upward movement of the blade, the rear edges 68''' thereof effect the cuts 63' in a vertical direction on the wall 61 whilst the lateral edges 68'' effect cuts 63 in a horizontal direction on the wall 58. It is obvious that the cuts 63 and 63' together form individual slots. The space between two adjacent slots on the ridge 58 is inversely proportional to the depth of penetration of the tips 68' of the blade 68 through the foil 72. This depth of penetration can be pre-selected, as shown in broken lines in FIGS. 26 to 28 in order to alter the resistance to tearing-apart of the containers along the rupture line and/or in dependence upon the material employed.

It should be noted that the cutting edges of the tips extend at an oblique angle, and not parallel, to the surfaces to be cut. Wear of the blades is thus reduced and the cutting action is improved.

As soon as the roof-shaped structure is formed and the cuts 63 and 63' have been effected, the forming or die member 66 and the cutter blade 68 are returned to their rest position, shown in FIG. 17, and the mould is opened. Containers with pre-formed rupture lines are then extracted from the mould and are ready for use.

In FIGS. 26 to 31, three different die members 66 are shown for producing three different types of ridges. These ridges are identical in their centre regions but are different in their outer regions. The central region corresponds to the area in which the pre-determined breakage lines is formed relative to the folding rib. The die members may be so shaped as to form either straight line ridges or broken line ridges in the plastics material foil.

FIGS. 32 to 34 show the constant incline of the upper part 66' of the member 66.

Figure 35:
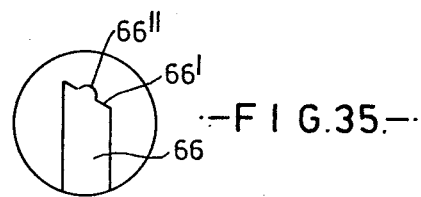

In FIG. 35, the upper 66' of the member has a relief 66'' for producing a reinforcing rib on the resultant fold with a shaping device formed in this manner, this rib being particularly advantageously employed in open containers.

I claim:

1. In a moulding apparatus comprising an upper mould member and a lower mould member for forming a plastics material container matrix having a pre-determined line of rupture between adjacent containers, said lower mould member having an upper surface for receiving said plastics material and a lower surface;

said lower mould member defining a bore extending from said upper surface to said lower surface;

die means slidably displaceable within said bore for deforming said plastics material, said die means having a plurality of faces;

cutter means slidably displaceable within said bore for cutting said plastics material, said cutter means defining a plurality of faces;

one of said faces of said die means being in a sliding abutment relationship with one of said faces of said cutter means, a longitudinal axis and at least one cutting edge, said at least one cutting edge extending obliquely to said longitudinal axis;

said upper mould member having a pressure member displaceably mounted thereon;

said pressure member having a lower surface;

said lower surface defining a cavity aligned with said bore in said lower mould member;

said cavity receiving at least a portion of said cutter member and said die member when said members are displaced, said cutter member extending into said cavity beyond said die member upon completion of such displacement;

said portion of said die means displaceable into said cavity defining an inclined end face;

said end face being so inclined that maximum deformation of said plastics material occurs along an extension of the line of abutment of said die means and said cutter means.

2. An improved moulding apparatus as defined in claim 1 wherein said cutter means comprises a cutter blade, said cutter blade having a substantially wedge-shaped form defining a longitudinal axis and terminating in a cutting tip portion, said cutting tip portion extending at an oblique angle to said longitudinal axis, cutting edges being provided along the intersections of said faces of said wedge.

3. In a moulding apparatus for forming a matrix of plastics material devices having a pre-determined rupture line between adjacent devices in said matrix, the improvement comprising the combination of:

an upper mould member, a lower mould member, a deforming die means, a cavity within said upper mould member for receiving said deforming die means, and a cutting means cooperating with said deforming die means and in sliding relationship therewith, said deforming die means extending beyond said cutting means in the direction of said upper mould member, said deforming die means and said cutting means being raised together towards said cavity in said upper mould member thereby deforming said plastics material, said cutting means adapted for extension towards said cavity beyond said die means in sliding relationship with said deforming die means for cutting said plastics material.

4. A method for forming a matrix of plastics material devices having a pre-determined rupture line between adjacent devices comprising the steps of:

(a) passing the plastics material between upper and lower mould members, the upper member having a cavity therein and the lower member having a bore therein, (b) displacing a combination means having a deforming die means and a cutting means from said bore in said lower mould member to said cavity in said upper mould member thereby deforming said plastic, (c) slidably displacing said cutting means with respect to said deforming die means to project further than said die means towards said cavity in said upper mould means, thereby cutting a portion of said plastics material, (d) withdrawing said combination means from said deformed plastic material towards said lower mould member.

* * * * *